Nov. 16, 1965  F. J. KOVAC ETAL  3,217,778
PNEUMATIC CORD TIRE
Filed Oct. 2, 1963

INVENTOR.
FREDERICK J. KOVAC
GROVER W. RYE
BY
J. B. Holden
ATTORNEY

United States Patent Office 3,217,778
Patented Nov. 16, 1965

3,217,778
PNEUMATIC CORD TIRE
Frederick J. Kovac, Akron, and Grover W. Rye, Cuyahoga Falls, Ohio, assignors to The Goodyear Tire & Rubber Company, Akron, Ohio, a corporation of Ohio
Filed Oct. 2, 1963, Ser. No. 313,382
10 Claims. (Cl. 152—359)

This invention relates to pneumatic tires and particularly to a tire containing texturized cord fabric reinforcement.

In conventional cord tire casings, the reinforcement is formed from one or more plies of fabric that girth the tire from bead to bead. The plies are positioned so that the orientation of the cord reinforcement of one ply is angularly disposed with respect to the cord reinforcement of the adjacent ply or plies. It has heretofore also been conventional to form each reinforcement ply with closely spaced, straight parallel oriented cords held in position with a minimum of non-load carrying tie-in fill members. Each of the cord reinforcement members are normally made from a plurality of yarns that are in turn composed of several individual filaments. The conventional tire reinforcement cord is fabricated by twisting a selected number of yarns in one direction. The yarns are then twisted together with a twist opposite that of the twist utilized in the formation of the yarns. The cord thus formed is very stable and lends itself well to providing tensile strength for the ordinary automobile tire.

With the advent of wider low profile and two-ply tires, the cord reinforcement must excel not only in its ability to withstand tensile loads, but also compressive loads. Compressive loads become more significant as the tire becomes more yieldable through lower operating pressures that result in a larger ground contact area or foot print. Another factor that makes compressive loads more important is that rubber compounds are giving greater mileage, thus increasing the useful life of a tire. As a result of the increased tire life, the cord reinforcement must undergo a greater number of stress reversals. In the ordinary tire the cord reinforcement has little elasticity when subjected to a compressive load. The inability to take a compressive load leads to low fatigue life; hence, an ultimate breakdown of the load carrying capabilities of the cords. The lack of elasticity of such tire cords detracts from the impact absorbing action and hence the riding characteristics.

The term "texturized" is used to connote a reinforcement in which the individual fibers or groups of fibers have been purposely bent or deformed from their straight or extruded configuration. The principle behind the manufacture of a texturized or stretch yarn is that the yarn is held in a crimped or bent position by suitable means while at an elevated temperature and on cooling the yarn remains crimped. If a texturized yarn is pulled, the crimps straighten out and the yarn is then capable of withstanding a tensile load. When the elongating force is removed, the crimps reform and the yarn contracts in length because of memory characteristics that have been imparted to it.

Filamentary material that lends itself well to texturizing can be any artificial thermoplastic organic substance such as linear polyamides, linear polyesters such as polyethylene terephthalate, polyacrylonitrile and polyolefins. Non-thermoplastic substances, such as rayon, and staple products, such as cotton, are not considered applicable to the present invention. In some of the thermoplastic materials, such as polyethylene terephthalate, the filaments have been stretched to enhance their crystalline structure, thus resulting in an extra strong material. In order to insure heat stability, the oriented or stretched filamentary material is heat set at a temperature below that which would destroy the crystallinity previously imparted thereto. In the crimping operation used to produce a texturized yarn, the heat applied is enough to produce a permanent memory, but not enough to destroy the orientation previously created within the yarn.

It is an object of the present invention to provide a reinforced pneumatic tire that contains therein texturized yarns capable of withstanding the tensile loads encountered during operation of the tire, yet possessing enough resilience to absorb the stresses resulting from compressive loads.

It is an additional object of the present invention to incorporate into a pneumatic tire a texturized reinforcement yarn containing a series of undulations that do not result in a twisting of the yarn.

A further object of the invention is to provide a pneumatic tire capable of absorbing a concentrated local deformation without rupturing the carcass.

An additional object of the present invention is to provide a texturized reinforcement yarn that has been heat set in a helical no twist configuration about the longitudinal axis thereof.

Another object of this invention is to utilize to the fullest extent the physical characteristics of synthetic tire reinforcement.

Conventional cord reinforcement formed by twisting can result in tensile losses as great as 20%, as will be explained hereinafter. The use of untwisted yarns in a texturized condition results in improved load carrying capabilities because of the better tensile yield obtainable from the reinforcement material.

While some of the more obvious features and characteristics of the present invention have been pointed out above, others will readily be apparent from the following disclosure and claims together with the accompanying drawing in which:

Figure 1:
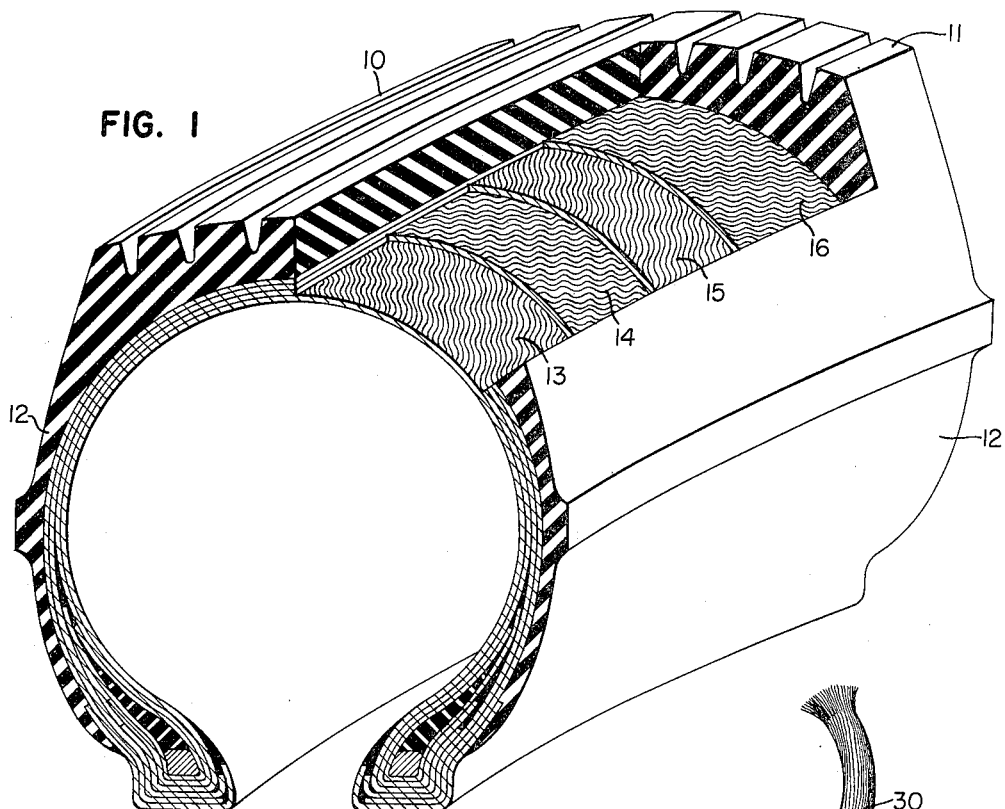
FIG. 1 is a fragmentary perspective view showing a pneumatic tire containing reinforcement as set forth in the present invention.

Referring to the drawing, FIG. 1 shows a perspective view of a pneumatic tire 10 in which a portion of the tread stock 11 and sidewall rubber 12 have been removed in order to more clearly show the tire reinforcement layers 13, 14, 15 and 16. A conventional 4-ply tire construction is shown; however, the reinforcement of this invention would work equally well with other types of tire construction. As tire 10 encounters a rough object, such as a rock, the tread stock 11 absorbs the cutting tendency of the object but the tire reinforcement layers must bend around the object that is deforming the toroidal shape of the tire. As the circumferential convexity of the tire is disrupted, a depression or concavity is formed around the indenting object. The points of contraflexure between the concave and convex surfaces, as is typical in pressure vessels, are the areas of greatest stress reversals. A tire reinforcement ideally is in a state of tension coupled with bending during tire usage. The absorption of rough blows to the tire carcass, particularly in the footprint, causes greatly increased compressive and tensile stresses to be induced in the tire reinforcement. Since the bending stresses are ever-present in a moving tire, the additional compressive and tensile stress caused by a blow adds to the compressive and tensile components thereof, thus causing failure of the individual filaments of which the tire reinforcement is composed. The ordinary twisted cord reinforcement utilized in tires can withstand direct tensile loads without serious detrimental effect. When similar compressive loads are imposed upon a reinforcement cord plied from twisted yarns, improper pantographing occurs and the fatigue life is sharply reduced; hence, early failure results.

Figures 2, 3, 4:
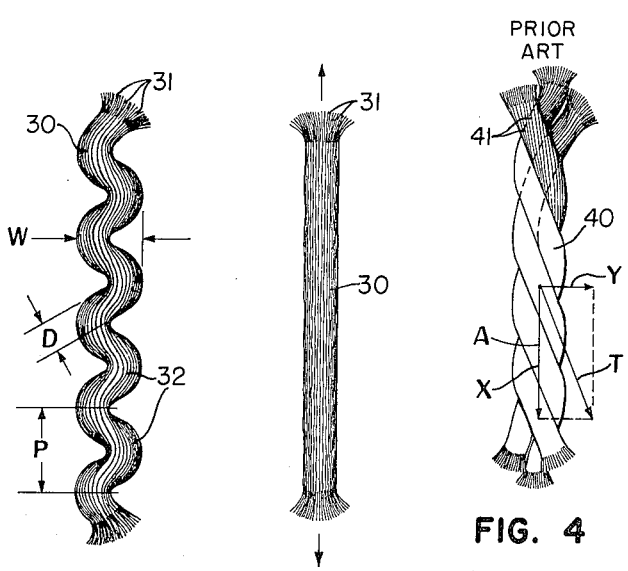
FIG. 2 is an enlarged view showing a texturized group of fibers in the relaxed condition.
FIG. 3 is a view similar to FIG. 2 except that the fibers are fully elongated.
FIG. 4 shows a prior art reinforcement cord of twisted construction and a force diagram of the tensile load carried by the cord.

FIG. 2 is an enlarged view in which the texturized tire reinforcement is shown. Yarn 30 is formed from a group of individual filaments 31. The group of filaments are then heat set in a helically crimping operation that produces turns 32. The overall diameter W of turns 32 is preferably two to three times the diameter D of yarn 30. The texturizing of the yarn 30 can be accomplished by feeding the thermoplastic yarn from a supply source into a heater, then through a false twister to a suitable withdrawal and/or collection means. Crimping and false twisting of thermoplastic threads is well-known in the art; therefore, space will not be devoted to a description of the apparatus by which such results can be achieved. Yarn 30 is preferably helical in shape or configuration similar to that of a cork-screw. The yarn can also be formed without a helical configuration. For example, a series of well-defined sinusoidal crimps will work equally well. Additionally, yarn 30 has a substantially constant pitch P as shown in FIG. 2.

FIG. 3 shows the yarn of FIG. 2 in the fully elongated condition. The helical false twist is shown completely removed without rotation of the ends taking place. In the unstretched condition of FIG. 3, yarn 30 can carry the tensile load imposed upon it when incorporated within a pneumatic tire. Each individual filament is aligned parallel to the direction of its load carrying path. This is not so if the yarn is in the twisted condition when subjected to an axial load.

FIG. 4 by contrast shows a prior art cord 40 that is of twisted construction. The individual filaments 41 are not aligned axially with respect to the axial direction, but rather are oriented at some angle thereto such as A. The tensile load T represents the tension that can be carried by the filaments. It is then quite obvious that the load carrying ability X of the cord is less than tensile load T. An additional force Y is necessary to balance the force diagram. Force Y can introduce shear stresses which are detrimental to the overall fatigue life of the cord.

Figure 5:
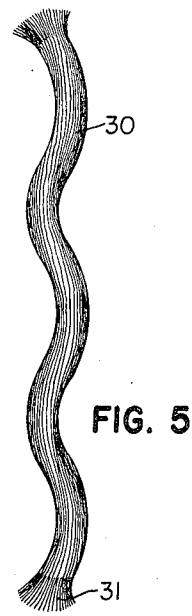
FIG. 5 is a view showing the configuration of the yarn when in position within the cured tire.

FIG. 5 represents the position of yarn 30 as it is found in the completed pneumatic tire. The attitude of yarn 30 is between the fully relaxed texturized yarn of FIG. 2 and the completely elongated yarn of FIG. 3.

A complete fabric ply within a tire such as 10 has embedded therein closely spaced yarns lying in the plane of the ply that extends helically from one end of the strip to the other. The fabric including the texturized yarns can be cut diagonally to form plies for tire building. The tire carcass can be laid in plies upon a drum in the conventional tire building manner. The plies containing yarns 30 are ideally placed one upon the other in the tire carcass with the yarns of adjacent plies opposite in angularity as is shown in FIG. 1.

When the drum-built uncured tire containing the yarns of this invention is expanded during the cure cycle the yarns will become partially elongated as shown in FIG. 5. The resulting finished pneumatic tire is therefore inherently elastic in that yarns 30 can, upon slightly more elongation, develop their load carrying capabilities and in those instances when compressive loads are present the yarns can compress without undue damage thereto. Since thermoplastic synthetic fibers have a memory, the yarn will have a tendency to return to its original unstressed texturized condition. This feature insures a greater fatigue life, primarily because the heretofore compressive loads could not be distributed along the cord reinforcement without rupturing the individual filaments of which the reinforcement cord was composed.

While certain representative embodiments and details have been shown for the purpose of illustrating the invention, it will be apparent to those skilled in this art that various changes and modifications may be made therein without departing from the spirit or scope of the invention.

We claim:

1. A pneumatic tire of elastomeric material having reinforcement material bonded in at least one layer, said layer comprised of individual reinforcing strands formed of yarns all of which have a helical configuration, thus permitting said yarns to elongate under tensile loads and to absorb compressive loads.

2. A pneumatic tire carcass of elastomeric material having filamentary reinforcement located therein, said filamentary reinforcement contained within a plurality of layers of fabric stock angularly disposed with respect to each other, all of the individual reinforcement of said layers formed of yarns having a helical non-twisted configuration imparted thereto so that said yarns can elongate under tensile loads and can absorb compressive loads within the carcass under severe local impacts.

3. A pneumatic tire carcass of vulcanized rubber having thermoplastic filamentary reinforcement in the form of yarns therein, the yarns comprised of a plurality of filaments all of which are arranged adjacent to each other in substantially parallel orientation and having imparted thereto a helical non-twisted configuration.

4. A tire reinforcement filamentary material formed from a group of continuous thermoplastic filaments all of which are oriented about a longitudinal axis in a helical non-twisted configuration so that under the influence of an axial load the individual filaments can elongate and assume an orientation essentially parallel with the direction of the load.

5. A pneumatic tire carcass of vulcanized rubber reinforced with a plurality of thermoplastic yarn reinforced layers in which the axis of the yarns are substantially parallel with respect to each other, said layers so positioned so that the yarn axis of one reinforcement layer are angularly disposed with relation to the yarn axis of the adjacent reinforcement layer, all of said yarns comprised of a plurality of fibers helically oriented about the longitudinal yarn axis in a non-twisted configuration whereby the yarns can elongate under tensile loads and can absorb compressive loads without damaging the yarn.

6. A tire as claimed in claim 5 in which the thermoplastic yarn is a polyester.

7. A tire as claimed in claim 6 in which the polyester is polyethylene terephthalate.

8. A tire as claimed in claim 5 in which the thermoplastic yarn is a polyamide.

9. A pneumatic tire having at least one reinforcement layer therein that contains a plurality of filamentary yarns positioned adjacent each other, all of said yarns crimped with helical undulations of a substantially constant pitch in the axial direction of the yarn, whereby the yarns of a completed tire will have a tendency to return to their original helical crimped condition.

10. A pneumatic tire of elastomeric material having at least one reinforcement layer therein that contains a plurality of helically crimped filamentary yarns all of which are positioned in side-by-side relationship with respect to each other, said helically crimped filaments deviating as a group from the axial direction of the yarn with a substantially constant pitch so that the yarns when under an axial load can elongate and when in the untensioned condition can return to their non-linear configuration.

References Cited by the Examiner

UNITED STATES PATENTS

| | | | |
|---|---|---|---|
| 1,519,545 | 12/1924 | Marquette | 156—128 |
| 1,779,391 | 10/1930 | Darrow | 156—128 |
| 1,875,445 | 9/1932 | Hall | 152—361 |
| 2,179,374 | 11/1939 | Kraft | 152—356 |
| 2,982,328 | 5/1961 | Emanueli et al. | 152—361 |
| 3,024,829 | 3/1962 | Cooper | 152—361 |
| 3,062,259 | 11/1962 | Boussu et al. | 152—356 |

ARTHUR L. LA POINT, *Primary Examiner.*